United States Patent [19]

Jones, Jr. et al.

[11] Patent Number: 4,737,336

[45] Date of Patent: Apr. 12, 1988

[54] CORE ASSEMBLY STORAGE STRUCTURE

[75] Inventors: Charles E. Jones, Jr., Northridge; Jay E. Brunings, Chatsworth, both of Calif.

[73] Assignee: The United States of America as represented by the United States Department of Energy, Washington, D.C.

[21] Appl. No.: 848,184

[22] Filed: Apr. 4, 1986

[51] Int. Cl.$^4$ .................. G21C 19/00; G21C 19/06
[52] U.S. Cl. ..................................... 376/272; 376/270
[58] Field of Search ............... 376/272, 269, 270, 171, 376/172

[56] References Cited

U.S. PATENT DOCUMENTS 4,443,403  4/1984  Plagnard ........................... 376/270

FOREIGN PATENT DOCUMENTS

| 2730729 | 1/1979 | Fed. Rep. of Germany | 376/272 |
| 2909549 | 9/1980 | Fed. Rep. of Germany | 376/272 |
| 0138991 | 10/1979 | Japan | 376/272 |
| 0038694 | 3/1984 | Japan | 376/272 |
| 1018618 | 1/1966 | United Kingdom | 376/272 |
| 1583303 | 1/1981 | United Kingdom | 376/272 |

OTHER PUBLICATIONS

"A Proven Solution for Interim Storage", Nuclear Eng. Int., 11/83.
"Waste Management", Deacon, Nuclear Eng. Int., 8/81, pp. 32–36.
"Storing Spent Fuel in Surface Drywells", Nuclear Eng. Int., 4/82, pp. 23–25.

Primary Examiner—Deborah L. Kyle
Assistant Examiner—Daniel Wasil
Attorney, Agent, or Firm—Robert Southworth, III; Judson R. Hightower

[57] ABSTRACT

A structure for the storage of core assemblies from a liquid metal-cooled nuclear reactor. The structure comprises an enclosed housing having a substantially flat horizontal top plate, a bottom plate and substantially vertical wall members extending therebetween. A plurality of thimble members extend downwardly through the top plate. Each thimble member is closed at its bottom end and has an open end adjacent said top plate. Each thimble member has a length and diameter greater than that of the core assembly to be stored therein. The housing is provided with an inlet duct for the admission of cooling air and an exhaust duct for the discharge of air therefrom, such that when hot core assemblies are placed in the thimbles, the heat generated will by convection cause air to flow from the inlet duct around the thimbles and out the exhaust duct maintaining the core assemblies at a safe temperature without the necessity of auxiliary powered cooling equipment.

10 Claims, 2 Drawing Sheets

# CORE ASSEMBLY STORAGE STRUCTURE

STATEMENT OF GOVERNMENT INTEREST

The Government has rights in this invention pursuant to Contract (or Grant) No. DE-AC06-79ET37109 awarded by the U.S. Department of Energy.

BACKGROUND OF THE INVENTION

1. Field of the Invention

The present invention is broadly directed to the storage of core assemblies from a nuclear reactor. In a more particular aspect, it is directed to the storage of core assemblies from a liquid metal-cooled reactor of the loop or pool type. In a pool type reactor the nuclear reactor core and various auxiliary equipment such as intermediate heat exchangers, pumps and the like, are all immersed in a pool of liquid metal coolant and contained within a sealed vessel as opposed to a loop type of reactor wherein only the reactor core is contained within the pool of liquid sodium and the pumps and heat exchanger are located externally of the vessel containing the sodium and core.

2. Description of the Prior Art

Most, if not all, nuclear powered facilities for the generation of electrical power include provisions for onsite temporary storage of spent nuclear fuel assemblies. The reason for such temporary storage is to allow the spent fuel assemblies to decay to a temperature and radiation level that will permit their being placed in canisters for shipment to a permanent disposal or fuel reprocessing site. In the case of water-cooled reactors, the fuel assemblies are typically immersed in a large pool of water. Generally, pumps and heat exchangers are provided to cool the water as required.

Such a storage system, while satisfactory for water-cooled reactors, presents several disadvantages when utilized with a liquid-metal cooled reactor. Obviously, water cannot be used as the cooling medium since the fuel assemblies would have residual alkali metal such a sodium contained thereon and sodium is highly reactive with water. In addition, if sodium is used as the coolant in a storage pool, the problems of temperature control are substantially compounded. Specifically, there must also be means included for maintaining the temperature of the sodium or liquid metal above its melting point when there were none or only a few heat generating core assemblies contained therein. Conversely, if the pool of liquid metal were filled to capacity with, for example, spent fuel elements, then it might be necessary to provide some means for dissipating the heat that they would generate. Further, in many instances it may be required to provide surge tanks to compensate for the differences in volume in the storage vessel resulting from changes in the number of core assemblies contained therein. Still further, a high temperature liquid metal which is highly reactive is more difficult to contain and circulate than, for example, water. Another disadvantage of using a pool of liquid metal for storage of core assemblies is the large inventory of sodium required. Still another disadvantage is the necessity of an auxiliary power supply to maintain safe operation of the storage system in the event of a general power failure.

OBJECTS OF THE INVENTION

It is an object of the invention to provide a core assembly storage structure which does not require a large pool of liquid metal.

It is another object of the invention to provide a core assembly storage structure which requires minimal auxiliary equipment for maintaining the core assemblies at a safe temperature.

Another object of the invention is to provide a core assembly storage structure which utilizes natural convection currents for maintaining core assemblies at a safe temperature.

Still another object of the invention is to provide a core assembly storage structure in which core assemblies may be safely stored without the need of an external source of power.

These and other objects of the invention will be more apparent in the drawings and the following detailed description.

SUMMARY OF THE INVENTION

Broadly, the present invention is directed to an improvement in a storage structure for core assemblies from a liquid metal-cooled nuclear reactor. It is particularly applicable to nuclear reactors of the pool type wherein not only the reactor core barrel containing core assemblies but also some of the auxiliary equipment including, for example, heat exchangers and pumps are all immersed in a pool of the liquid metal contained within a containment vessel. Typically, the liquid metal will be sodium, potassium or eutectic mixtures thereof. Generally, the core assembly storage structure will be located adjacent the containment vessel.

The storage structure of the present invention comprises an enclosed housing having substantially flat horizontal top and bottom plate members and substantially vertical wall members extending therebetween. Located within the housing there generally will be provided a plurality of substantially vertical support members interconnecting the top and bottom plate members. A key aspect of the invention is the provision of a plurality of thimble members extending downwardly from said top plate, each thimble member being closed at a lower end and open at an upper end. The thimble members have a length and diameter greater than that of the core assemblies to be stored therein.

An inlet duct and an exhaust duct are provided for the passage of air through the housing. A unique advantage of the present invention is that the heat generated by the core assemblies in the thimbles will by convection maintain a flow of cooling air through the structure and up the exhaust stack without the necessity of auxiliary powered equipment such as fans, pumps, heat exchangers and the like. The fuel transfer cell and fuel handling cell provide an inert environment to protect the liquid metal in the reactor and core component pots. The thimbles in the bottom of the fuel transfer cell separate the cell inert gas from the cooling air outside the thimbles.

DETAILED DESCRIPTION OF THE INVENTION

Figure 1:
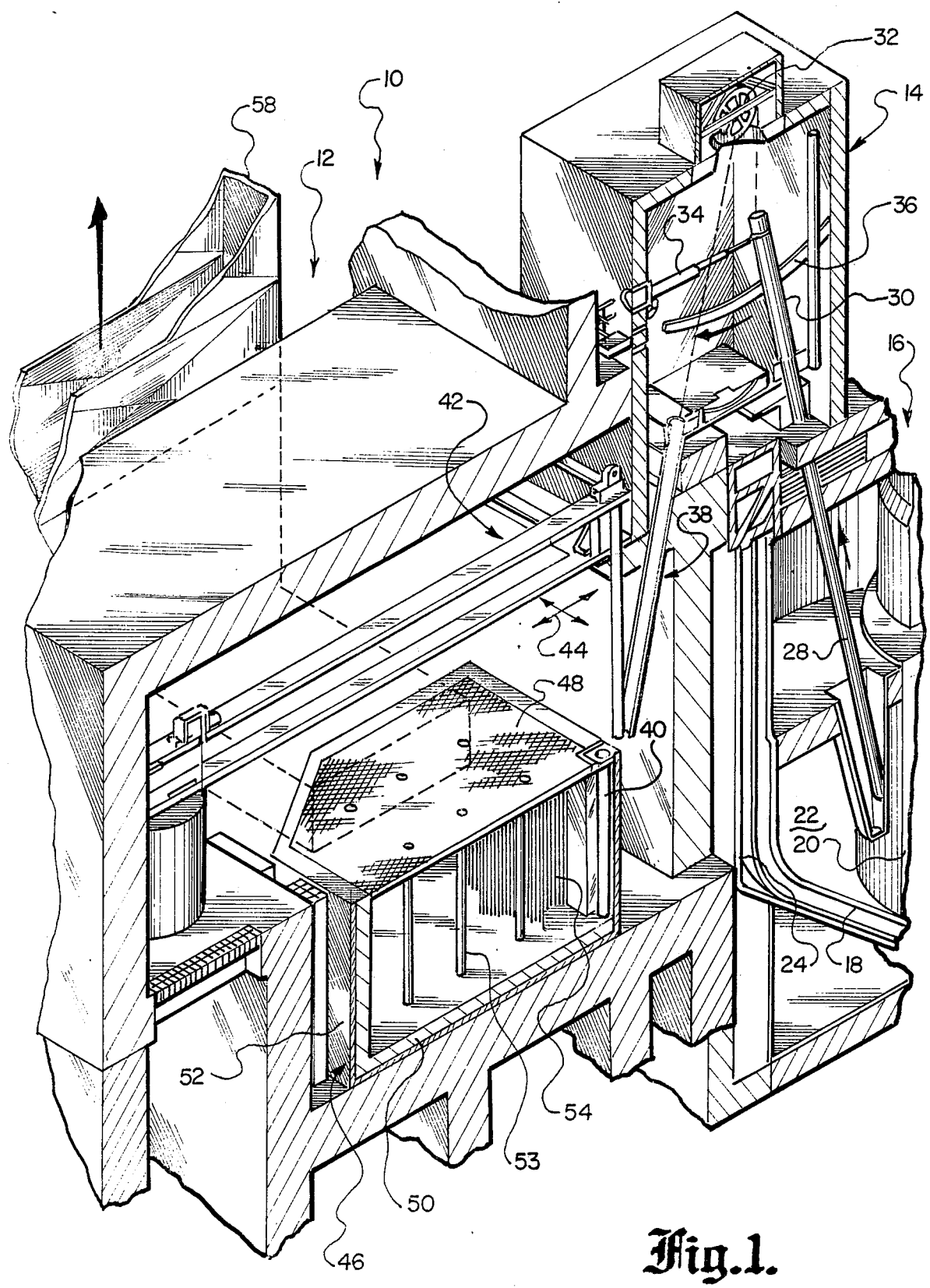
FIG. 1 is a perspective view, partially broken away, of a liquid metal-cooled nuclear reactor of the pool-type showing a structure for the storage of core assemblies in accordance with the present invention.

Referring now to FIG. 1 therein is depicted a portion of a liquid metal cooled nuclear reactor facility 10 which includes a core assembly storage structure 12 of the present invention, a fuel transfer cell 14 and a nuclear reactor assembly 16. The reactor assembly comprises, among other things, a containment vessel 18 in which is located the reactor core barrel 20. Located within reactor core barrel 20 are a plurality of core assemblies including fuel assemblies, blanket assemblies and control rods which will require periodic removal. Also contained within containment vessel 18 is a large body or pool of alkali metal coolant 22. Typically, the alkali metal coolant will comprise sodium, potassium or a mixture thereof. In the interest of safety, nuclear reactor assembly 16 typically will include a guard vessel 24 which envelopes the containment vessel 18.

The core assemblies (and a core component pot which will be described more fully later) are introduced and removed from reactor assembly 16 via a bucket riding on a track and transfer duct 28 which extends upwardly to fuel transfer cell 14.

Fuel transfer cell 14 includes an extendable swing arm 30 which is provided with a drive means 32. Swing arm 30 is pivotally mounted at its upper end and angular movement thereof is provided by a linear actuator 34 and a guide track 36. Extending downwardly from fuel transfer cell 14 is a second track and transfer duct 38 which extends into the core assembly storage structure 12.

Located immediately beneath the bottom end of track and transfer duct 38 is a fuel positioning cell 40 for the transfer bucket. Core assembly storage structure 12 is provided with an overhead fuel handling machine 42 capable of movement in both horizontal axes as indicated by arrows 44, for the transfer of core assemblies between fuel positioning cell 40 to a core assembly storage structure 46. Storage structure 46 comprises top and bottom plate members 48 and 50 respectively. The space between top and bottom plate members 48 and 50 is enclosed by vertical wall members 52 which extend about the periphery of structure 46. Generally, there also will be provided intermediate top and bottom plate members 48 and 50 a plurality of vertically extending support members 53. Storage structure 46 also is provided with a plurality of thimbles 54 for receiving and storing core assemblies.

Figure 2:
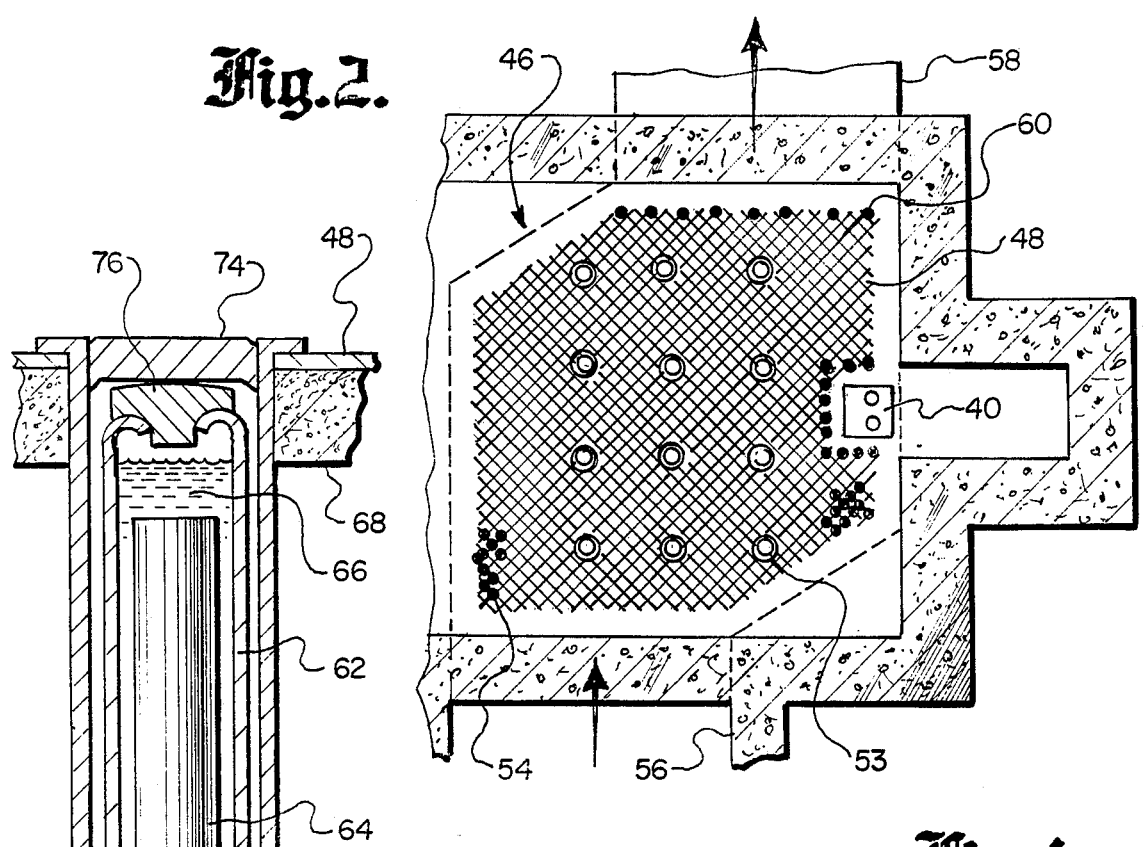
FIG. 2 is a partial plan view of the fuel storage structure of the present invention.

Referring to FIGS. 1 and 2, it is seen that storage structure 46 is also provided with an inlet duct 56 on one side and an exhaust duct 58 on an opposite side of the passage of cooling air through the storage structure and up the exhaust stack. Typically, structure 46 also will be provided with a series of storage positions 60 for canistered core assemblies awaiting shipment to a disposal or reprocessing site.

Figure 3:
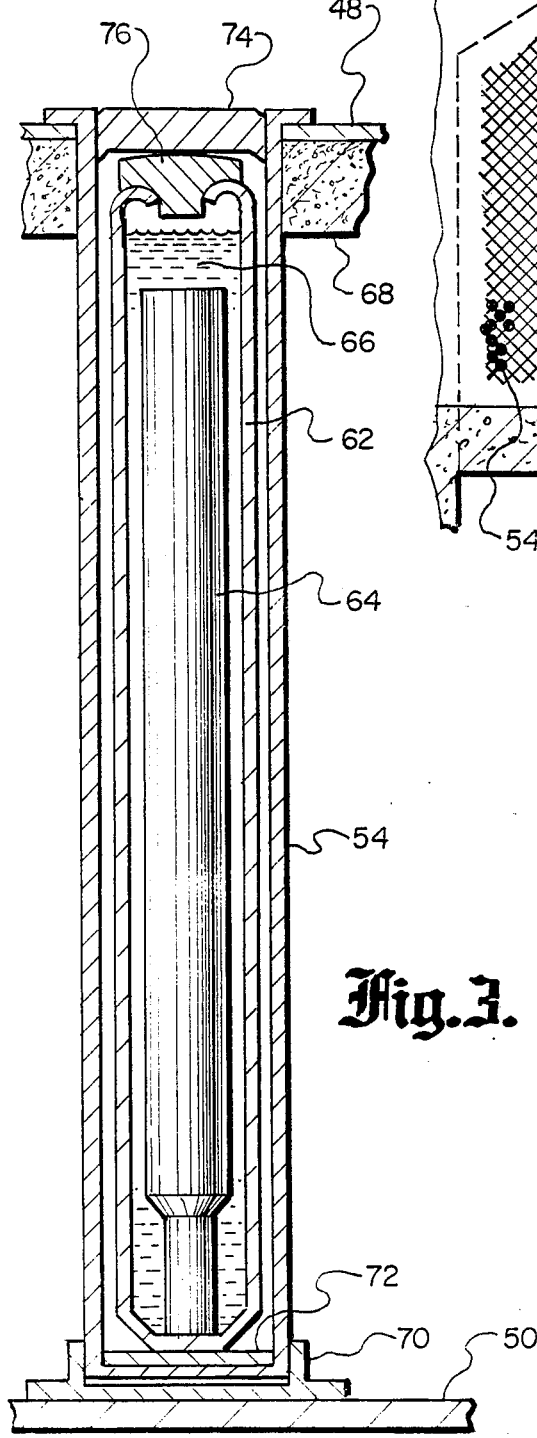
FIG. 3 is a schematic of a core assembly storage thimble of the present invention.
Figure 4:
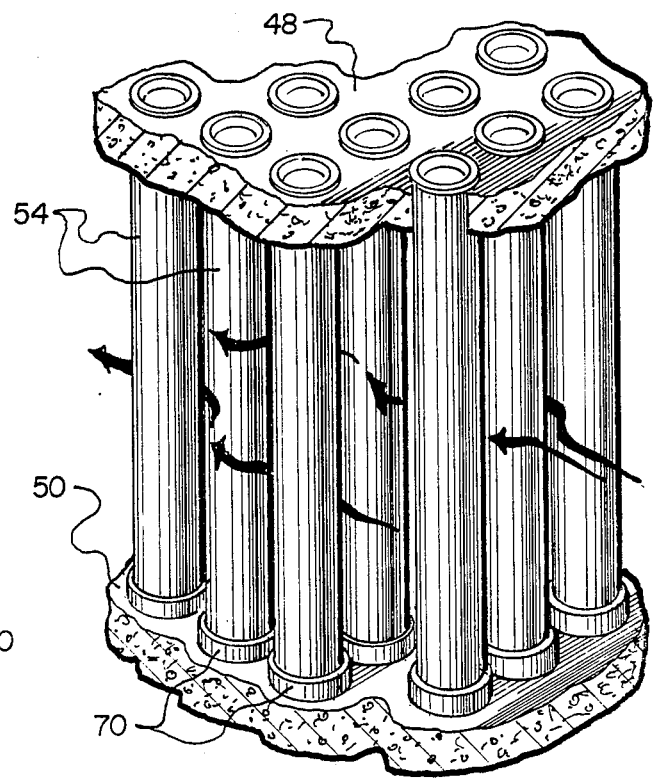
FIG. 4 is a perspective view of a partial array of storage thimbles showing air circulation therebetween.

Referring now to FIGS. 3 and 4, therein are depicted the details of thimble assembly 54. Specifically, it is seen that thimble assembly 54 comprises a substantially cylindrical hollow body closed at its lower end and open at its upper end adjacent plate member 48. In accordance with the preferred embodiment depicted in FIG. 3, thimble 54 has a diameter sufficient to freely accept a core component pot 62. Typically, the internal diameter of thimble 54 will be on the order of about ½ inch greater than the outside diameter of the core component pot 62. The length or depth of thimble 54 is not critical provided, however, that it is sufficient to contain substantially all of the core component pot within its confines. Located within the confines of core component pot 62 is shown a core assembly 64 which may be a fuel assembly, a blanket assembly or a control rod. Core assembly 64 is completely immersed in an alkali metal 66. Typically, the alkali metal will be sodium, potassium or a mixture thereof. During storage, depending upon the number of core assemblies present and the amount of heat being generated, the alkali metal may be either a liquid or a solid. It is a particular advantage of the present invention that if the temperature is such that the alkali metal solidifies, it is only necessary to remove the core component pot of interest for heating to remove or insert a core assembly.

In accordance with certain particularly preferred embodiments there will be provided a layer of insulating material 68 below a bottom surface of upper plate member 48. In addition, adjacent a lower portion of thimble 54 and affixed to an upper surface of bottom plate 50, there will be provided a support means such as a flange member 70 for providing lateral support in the event of a seismic event, and also to facilitate location and orientation of thimble member 54. Still further, in accordance with another preferred embodiment, the bottom of the interior of thimble 54 will be provided with a resilient cushioning means 72 for absorbing any shock when core component pot 62 is placed in the thimble. Typically, cushioning means 72 will comprise about an 11-inch tall, crushable honeycomb shock-absorbing material which is removable and replaceable inside the thimble.

It is also desirable to prevent sodium vapor leakage from the core component pots into the confines of storage structure 12 or the interior of thimble members 54. Accordingly there will generally be provided plugs or caps 74 and 76 to prevent outward leakage of sodium vapors. Two caps are shown to provide some redundancy. Obviously cap 76 could be used alone or both 74 and 76 could be a combined unit.

When utilizing storage structure 46 it is preferable that those core assemblies and core component pots which are hottest be placed adjacent the inlet duct where the air will be coolest with the cooler assemblies being located adjacent the exhaust duct. Thus, in practice, spent fuel assemblies will be located adjacent the inlet duct, the control rods adjacent the exhaust duct and any blanket assemblies would be located therebetween. In addition, the adjacent rows of thimbles from inlet to exhaust preferably are staggered such that, as depicted in FIG. 4, the air passing through structure 46 must necessarily follow a serpentine path around the thimbles such that a greater surface of the thimble is exposed to the cooling effect. In addition, in some instances it will be advantageous to provide the outer surface of core component pot 62 and the inner surface of thimble 54 with a coating which will enhance the transmission of thermal energy from the pot to the thimble. Typical of such a coating is a blank chrome plating. Alternatively, the surfaces may be artificially roughened to enhance the transmission of thermal energy.

While it is a particular advantage of the present invention that no auxiliary power source is required for maintaining the flow of cooling air around thimbles 54, it may be advantageous to have some means of inducing air flow. For example, when storage structure 46 is first being loaded with core assemblies there may not be sufficient heat generated to cause the desired air flow. Thus, it may be beneficial to have some means of initiating the flow of air which is later sustained by convection. Typical of such means would be the provision of a burner in the exhaust duct or alternatively a fan could be used either on the inlet or exhaust duct.

From the foregoing, the principal preferred construction and mode of operation of the invention have been illustrated and described in what is now considered to represent its best embodiment. It should be understood, however, that within the scope of the appended claims the invention may be practiced otherwise than as specifically illustrated and described.

What is claimed and desired to be secured by Letters Patent of the United States is:

1. In a liquid metal-cooled nuclear reactor wherein the reactor core barrel and some auxiliary equipment including core assembly transfer equipment are all immersed in a pool of liquid metal within a containment vessel, said reactor including an adjacent structure for the storage of core assemblies from said core barrel, the improvement in the core assembly storage structure comprising;

an enclosed housing, said housing having a substantially flat horizontal top plate, a bottom plate and substantially vertical wall members extending therebetween;
   a plurality of substantially vertical support members interconnecting said top and bottom plates;
   an inlet duct in fluid communication with the interior of said housing at one end and having an opposite end in fluid communication with a source of ambient air;
   an exhaust duct in fluid communication with an opposite wall of said housing and having an opposite end in fluid communication with the atmosphere;
   a plurality of thimble members extending through said top plate, each of said thimble members having a diameter and length sufficient to accommodate a core component pot member containing a core assembly immersed in liquid metal, said thimble members being arranged in adjacent rows, each of said rows being offset with respect to one another to cause a serpentine flow of air therebetween, said core assemblies being selected from the group consisting of fuel assemblies, blanket assemblies and control rods, the fuel assemblies being located adjacent said inlet duct, the control rods being located adjacent said exhaust duct and the blanket assemblies being located in between said fuel assemblies and control rods, whereby when hot core assemblies are placed in said thimbles the heat generated will by convection cause air to flow through said inlet duct around said thimbles and out said exhaust duct to maintain said core assemblies contained in said thimbles at a safe temperature without the necessity of auxiliary powered cooling equipment; and
   support means affixed to said bottom plate and located adjacent a lower end of each of said thimbles, said support means providing for lateral support of said thimbles in the event of a seismic disturbance and providing for linear thermal expansion of said thimbles.

2. The structure of claim 1 further including a layer of insulation adjacent a bottom surface of said top plate.

3. The structure of claim 1 further including means for initiating a flow of air through said housing.

4. The structure of claim 3 wherein said means for initiating a flow of air through said housing comprises a fan located in one of said ducts.

5. The structure of claim 3 wherein said means for initiating a flow of air through said housing comprises a burner located in the exhaust duct.

6. The structure of claim 1 wherein said exhaust duct terminates in a substantially vertically upwardly extending portion.

7. The structure of claim 6 further including a layer of insulation adjacent a bottom surface of said top plate.

8. The structure of claim 7 further including means for initiating a flow of air through said housing.

9. The structure of claim 8 wherein said means for initiating a flow of air through said housing comprises a fan located in one of said ducts.

10. The structure of claim 8 wherein said means for initiating a flow of air through said housing comprises a burner located in the exhaust duct.

* * * * *